United States Patent [19]

Fahy et al.

[11] Patent Number: 5,090,529
[45] Date of Patent: Feb. 25, 1992

[54] BRAKE MECHANISM

[75] Inventors: Arthur J. Fahy, Double Bay; Neil Gillies, Earlwood; Malcolm V. Wade, Meadowbank, all of Australia

[73] Assignee: IVG Australia Pty. Limited, Bankstown, Australia

[21] Appl. No.: 590,292

[22] Filed: Sep. 28, 1990

[30] Foreign Application Priority Data

May 16, 1990 [AU] Australia .................. PK0171

[51] Int. Cl.⁵ .................. B60K 41/26; F16D 55/48
[52] U.S. Cl. .................. 192/8 R; 188/82.9; 188/134; 192/7
[58] Field of Search ............. 192/8 R, 7, 104 R, 1.38; 188/82.9, 134, 187, 264 P

[56] References Cited

U.S. PATENT DOCUMENTS

| | | | |
|---|---|---|---|
| 710,757 | 10/1902 | Coleman et al. | 192/8 R |
| 710,758 | 10/1902 | Coleman et al. | 188/82.9 |
| 1,614,629 | 1/1927 | Quick et al. | 192/8 R |
| 2,675,898 | 4/1954 | Morgan | 192/104 R X |
| 2,783,861 | 3/1957 | Jungles | 192/8 R |
| 3,194,366 | 7/1965 | Hensel | 192/8 R |
| 3,536,169 | 10/1970 | Arnold | 192/8 R X |
| 3,584,708 | 6/1971 | Heck | 188/264 P X |
| 3,797,614 | 3/1974 | McCay | 188/134 |
| 4,842,109 | 6/1989 | Avny | 192/8 R |
| 4,860,869 | 8/1989 | Hall | 188/134 X |
| 4,909,363 | 3/1990 | Trommer | 192/8 R |

FOREIGN PATENT DOCUMENTS

1341707 12/1973 United Kingdom .............. 192/8 R

Primary Examiner—Rodney H. Bonck
Attorney, Agent, or Firm—Dellett, Smith-Hill and Bedell

[57] ABSTRACT

The mechanism 204 prevents reversal of the torque of shaft 203 by braking two disc members 206, 207 against braking surfaces of a casing 205. Under normal operating conditions the member 206 is turned by a motor 202 controlling a load 200 in a direction which causes its drive to be transmitted through balls 221 to the member 207. In this condition minimal braking occurs. If the direction of the shaft 203 is reversed, the balls 221 force apart contiguous camming surfaces on the disc members so that their braking surfaces engage the casing to brake the shaft 203. Controlled manual release of the load under braked conditions is permitted by turning a handle 224 driving a shaft 210 which turns the member 207. Minimal braking friction during normal operations is reduced still further by creating a cushion of oil between the braking surfaces, the oil being provided by a gear pump 216 driven off the shaft 210. The braking surfaces on the casing are referenced 208, 209 and are borne upon by complementary rim surfaces of the disc members 206, 207.

19 Claims, 5 Drawing Sheets

BRAKE MECHANISM

FIELD OF INVENTION

This invention relates to a braking mechanism which responds automatically to a reversal in an applied torque by applying a brake. Such a mechanism may be used to protect a load from "running away" if a driving torque falls beneath a certain value, or for interrupting a transmission of drive between a motor and a load.

STATE OF THE ART

An inclined travelling slat conveyor required to lift a distributed load between two levels can cause extensive damage if there is a failure of its operating motor. The loss of driving torque may cause the distributed load on the conveyor to take charge, and reverse the direction of movement of the conveyor. Unless precautions are taken to prevent it, the distributed load is then deposited at the lower end of the conveyor with serious consequences to equipment and personnel at the lower level.

A similar problem is encountered in many other spheres of activity, where heavy loads are being moved, one such activity is the operation of a bucket elevator.

SUMMARY OF THE INVENTION

In accordance with a first aspect of the invention a braking mechanism which becomes automatically effective when there is a reversal in the direction of torque, comprises two members having a common axis and between which relative rotation about the axis occurs when there is a reversal in the direction of the applied torque; a housing surrounding the two members; a first braking surface provided on one of the members and a second, complementary and opposed braking surface provided on the housing; first means operating to accommodate change in the spacing between the two members to control the extent of the braking; second means responsive to a reversal in torque direction to permit change in the relative angular positions of the members; camming means incorporating thrust-resistant means and responsive to the change in the relative angular positions of the members to alter the spacing between the members; and resilient means for biassing the braking surface towards one another to induce the required braking action promptly when the direction of torque is reversed.

PREFERRED FEATURES OF THE INVENTION

Preferably both members rotate and each is equipped with its own braking surface which engages a respective braking surface on the surrounding housing.

Conveniently the camming means comprises pairs of recesses formed on opposed faces, respectively, of the members. The recesses are suitably arcuate about the common axis and each may be tear-shaped with the tapered ends of the tears of each pair of recesses extending respectively in opposite directions about the common axis. In such an arrangement the thrust-resistant means is suitably a hard ball. If the torque direction through the mechanism reverses, the angular displacement between the members causes the ball to force the members apart so that braking is increased.

It is advisable to maintain at least some braking reaction between the braking surfaces under all conditions of operation. This may be achieved by the resilient biassing means which may be a compression spring or springs located between the two members.

In an advantageous arrangement of the invention, part of the drive transmitted through the mechanism is used to operate a hydraulic pump providing a hydraulic cushion between the braking surfaces so that they are forced apart and the wear on them is minimised when the direction of the torque transmission through the mechanism is in the desired direction. If the torque is reversed, braking immediately occurs as the braking surfaces are forced against one another. A reduction in the speed of rotation of the members with respect to the housing then ensues, and the output pressure of the pump falls. This reduces the effectiveness of the hydraulic cushion between the braking surfaces which can therefore contact one another more forceably to enhance the braking effect.

It is preferred for one of the two engaging braking surfaces always to be made from a softer material than the other braking surface.

In accordance with a second aspect of the invention a braking mechanism which becomes automatically effective when there is a reversal in the direction of applied torque, includes two members turned by the applied torque about a common axis and providing at least one braking surface engageable with a complementary braking surface of a surrounding housing, the two members being angularly displaceable and relatively axially moveable with respect to one another and having camming means arcuate about their common axis and engaged by thrust-resistant means which allow relative rotation of the members to bring different parts of the camming means into engagement with the thrust-resistant means and so vary the spacing between the members, the profiles of the camming means being so chosen that relative rotation of one of the members in one direction of rotation with respect to the other and produced by a reversal in the applied torque, causes the spacing between the members to change and bring said one braking surface into braking engagement with the complementary braking surface of the housing. Preferably each of the members has a braking surface.

In the preferred arrangement of the second aspect of the invention the two members comprise opposed spaced discs mounted slackly on a common shaft so as to permit them relative angular movement and axial movement, with respect to one another, while allowing both discs to be driven. The discs conveniently are provided on their remote faces with frusto-conical braking surfaces. If one disc turns with respect to the other in a direction which increases the effective axial thickness of the camming means between them, the two discs are thrust apart and braking ensues.

In a version of the invention used in a supervisory role to protect a load driven directly by a prime-mover, the two members having eccentric abutment surfaces at the same radius from their common axis. Rotation of one of the members in one direction by the prime-mover causes the abutments to engage and transmit the rotational drive to the other member. In this situation the assembly of camming means and thrust-resistant means allows the members to assume positions at which braking is a minimum. If now the applied torque is reversed, the abutment surfaces move apart and different parts of the camming surfaces are now borne on by the thrust-resistant means. The two members are urged apart as a consequence, and braking ensues.

Suitably, the second member is provided with a manually operable rotational drive which allows it to be turned gradually in the direction of reengagement of the abutment surfaces. The first member, under the action of the applied load torque, follows this movement. The load can thus be manually controlled in safety after the braking mechanism has operated.

INTRODUCTION TO THE DRAWINGS

The invention will now be described in more detail by way of examples, with reference to the accompanying diagrammatic and schematic drawings in which.

IN THE DRAWINGS

DESCRIPTION OF THE FIRST EMBODIMENT

Figure 1:
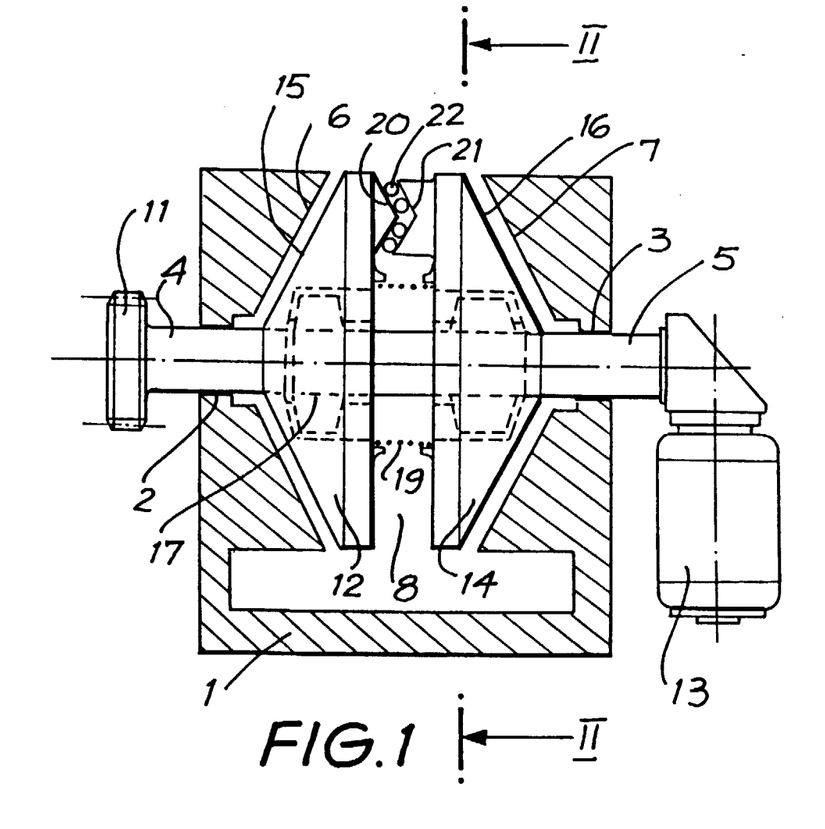
FIG. 1 shows a braking mechanism in vertical section interposed in a drive transmission between a motor and a load.

The mechanism of FIG. 1 comprises a fixed casing 1 having aligned bores 2 and 3 threaded by respective shafts 4 and 5. Annular frusto-conical braking surfaces 6 and 7 are provided on opposite sides of a central cavity 8 in the casing 1.

Figure 2:
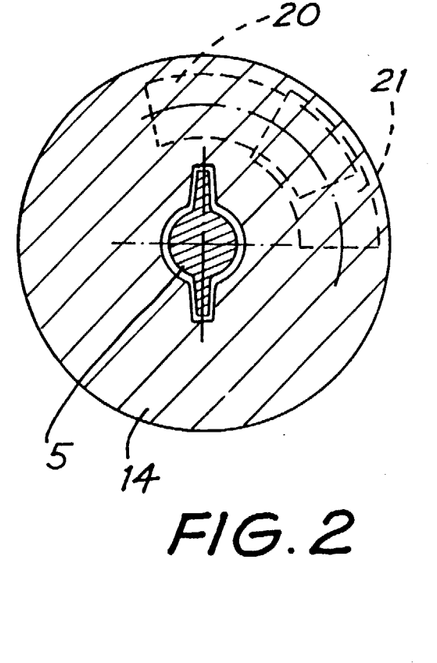
FIG. 2 is a vertical section through FIG. 1 taken on the line and in the direction indicated by the arrows II—II in that figure.

The shaft 4 carries outside the casing 1 a load pinion 11, and inside the casing it has slideably splined to it a first frusto-conical member 12 of disc shape. The shaft 5 is connected outside the casing to a drive motor 13, and inside the casing it is slackly keyed, as shown in FIG. 2, to a second frusto-conical member 14 also of disc shape. The two members 12 and 14 have respective braking surfaces 15, 16 on their remote faces which are complementary to the braking surfaces 6 and 7 of the casing 1. A light compression spring 19 provides a resilient bias which maintains the members 12, 14 in gentle rubbing engagement with the braking surfaces 6, 7. The shaft 5 extends across the cavity 8 and has its terminal portion 17 slackly keyed to the first member 12 in the manner shown in FIG. 2. Thus the members 12, 14 are permitted limited angular movement and axial movement with respect to one another on the shaft 5.

The opposed faces of the member 12 and 14 carry respectively opposed camming surfaces 20, 21 which are arcuate in shape and centred on the common axis of rotation of the members. The camming surfaces have respectively concave and convex, chevron-shaped cross-sections as shown in FIG. 1. Caged steel balls 22, providing thrust resistant means, are located between the camming surfaces. The extent to which the chevron face of the camming surface 21 projects from the face of the member 14, increases progressively around its arc.

OPERATION OF THE FIRST EMBODIMENT

In operation of the mechanism of FIGS. 1 and 2, drive is transmitted from the motor 13 to the load pinion 11 by way of the engagement of the shaft 5 with the member 12. The shaft 5 also drives the member 14 at the same speed. The positioning of the camming surfaces 20, 21 with respect to the balls 22 is such that in this drive condition the braking surfaces 6, 15 and 7, 16 gently rub on one another. The spring 19 provides a resilient reaction between the members 12 and 14 to maintain this slight rubbing action, which in this embodiment is essential to ensure an immediate response of the mechanism to a reversal in the torque through it.

If the direction of torque through the mechanism is reversed for any reason, the load pinion moves the member 12 angularly with respect to the member 14, the slack keying on the shaft 5 permitting this angular movement. The effect of the angular movement is to bring different parts of the camming surfaces 20, 21 opposite the balls 22 so that the members 12, 14 are forced apart and their braking surfaces 15, 16 are brought into firm braking engagement with the complementary braking surfaces 6, 7 of the casing. Braking of the load pinion then ensues.

DESCRIPTION OF THE SECOND EMBODIMENT

Figure 3:
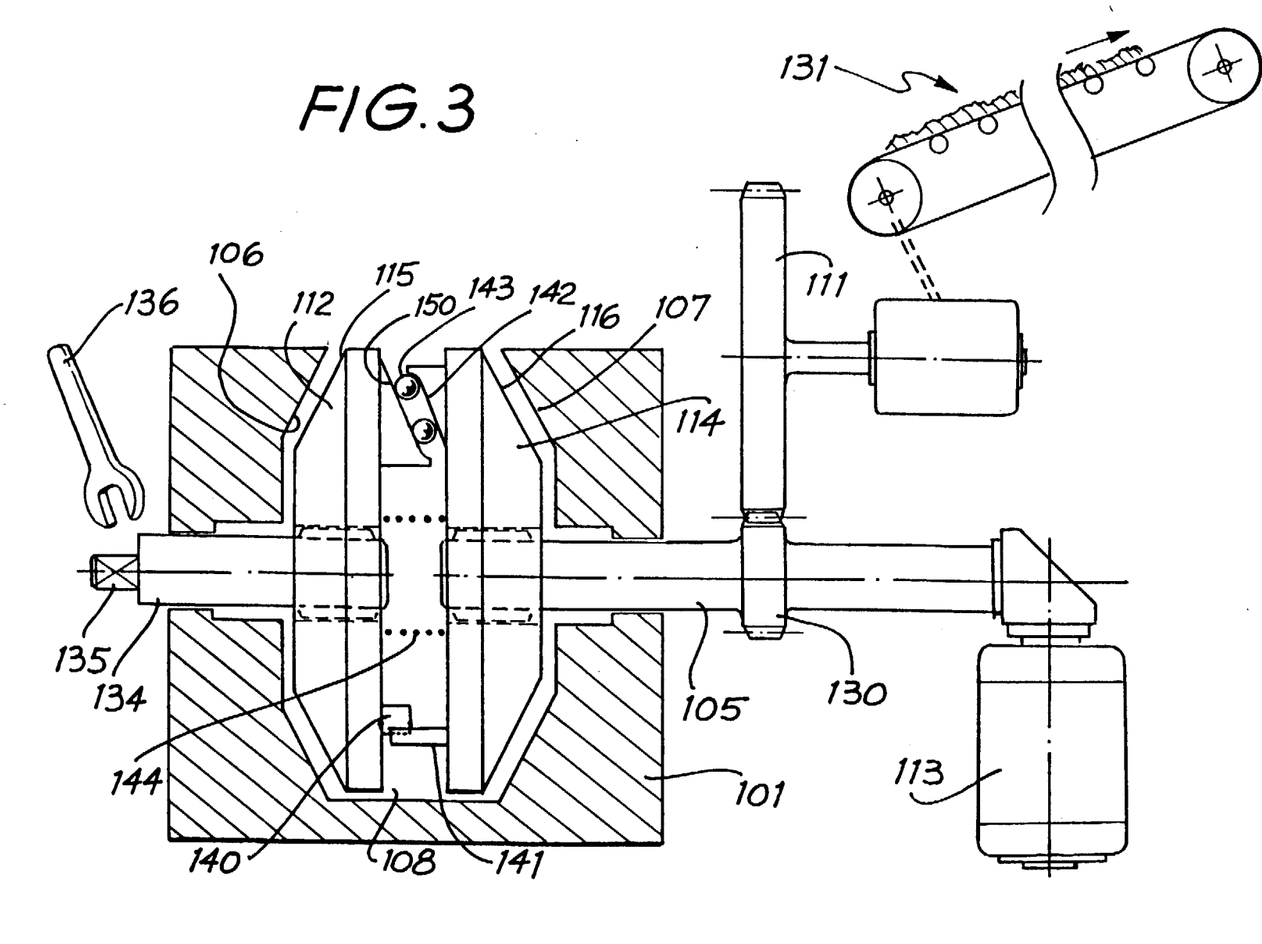
FIG. 3 shows a second form of braking mechanism exercising a supervisory role over a direct drive transmission between a motor and a load.

In the arrangement shown in FIG. 3, parts corresponding in function to similar parts of FIGS. 1 and 2, are correspondingly referenced but in the 'hundreds' series. Thus the casing 1 is referenced 101 in FIG. 3, and so forth. These parts will not be again described to avoid needless repetition of description.

In the arrangement shown in FIG. 3 a direct drive transmission connection is established from the motor 113 to a load pinion 111 by way of a drive pinion 130 fixed to the shaft 105. The load driven by the pinion 111 is an inclined slat conveyor 131 having parallel belt runs equipped with slats which lift a distributed load between two levels. A dangerous situation can develop with such an arrangement if power is removed from the motor 113 as this enables the load on the conveyor to descend out of control, by backdriving the motor, with the serious risk of consequences to a loading station at the lower end of the conveyor.

This risk is avoided by continuing the shaft 105 into a fixed casing 101, and slackly keying a member 114 on to its end inside a cavity 108 in a manner similar to that shown in FIG. 2. The member 114 faces a member 112 and they are provided on their remote surface with frusto-conical braking surfaces 115, 116 positioned to be engageable with complementary braking surfaces 106, 107 on the casing 101. The member 112 is slackly keyed to a shaft 134 which is coaxially arranged with respect to the shaft 105 and has a square cross-section terminal portion 135 outside the casing 101 to enable a manually operable spanner 136 to be applied to it to turn the member 112.

The opposed faces of the member 112, 114, are provided at generally diametrically opposite positions with two assemblies respectively. The first assembly comprises a pair of abutment elements 140, 141, which project from respective members 112, 114, at the same radius from their common axis of rotation. These abutment elements engage one another when the motor 113 is driving in a direction which operates the conveyor in a load-lifting direction. The rotation of the shaft 105 is then transmitted to the two members 112, 114.

The second assembly comprises a pair of arcuate camming faces 150, 142 which engage opposite sides of thrust-resistant balls 143 and are arcuate about the common axis of rotation of the members 112, 114. The spacing between the camming face 142 and the supporting member 114 increases progressively from one end of the arcuate camming face 142 to the other. A central, weak, coiled, compression spring 144 urges the opposed faces of the members 112, 114 apart so that their braking surfaces 115, 116 drag slightly on the casing 101 to maintain a slight braking effect.

OPERATION OF THE SECOND EMBODIMENT

When the motor 113 is driving the conveyor 131 in its lifting direction, the two members 112, 114 rotate together and the balls 143 are borne on by portions of the camming surfaces 150, 142, which enable the members 112, 114 to occupy positions which are closest to one another as illustrated.

If the direction of torque of the shaft 105 is reversed in direction, caused by the load on the conveyor 131 back-driving the motor 113, the member 114 reverses its direction of rotation to cause the abutment elements 140, 141 to move apart and the balls 143 to engage different parts of the camming surfaces 142, 150. This has the effect of forcing the two members 112, 114 apart so that their braking surfaces 115, 116 brake firmly on the complementary braking surfaces 106, 107 of the casing 101. The greater the reverse torque exerted on the shaft 105 by the back-drive of the load conveyor 131, the greater the braking force exerted by the mechanism.

Back-drive to the motor is thus prevented and the static load on the conveyor is held by the braking force of the mechanism.

By applying the spanner 136 to the end 135 of the shaft 134 while the load is braked to a stationary position by the mechanism, the member 112 can be manually turned in a direction corresponding to the descent of the load on the conveyor. The manual rotation of the member 112 is progressively followed by the rotation of the member 114 under the influence of the load on the conveyor. In this way the conveyor can be lowered gradually under total manual control, until the distributed load on it has been removed. The motor 113 can then be re-started.

DESCRIPTION OF THE THIRD EMBODIMENT

Figure 4:
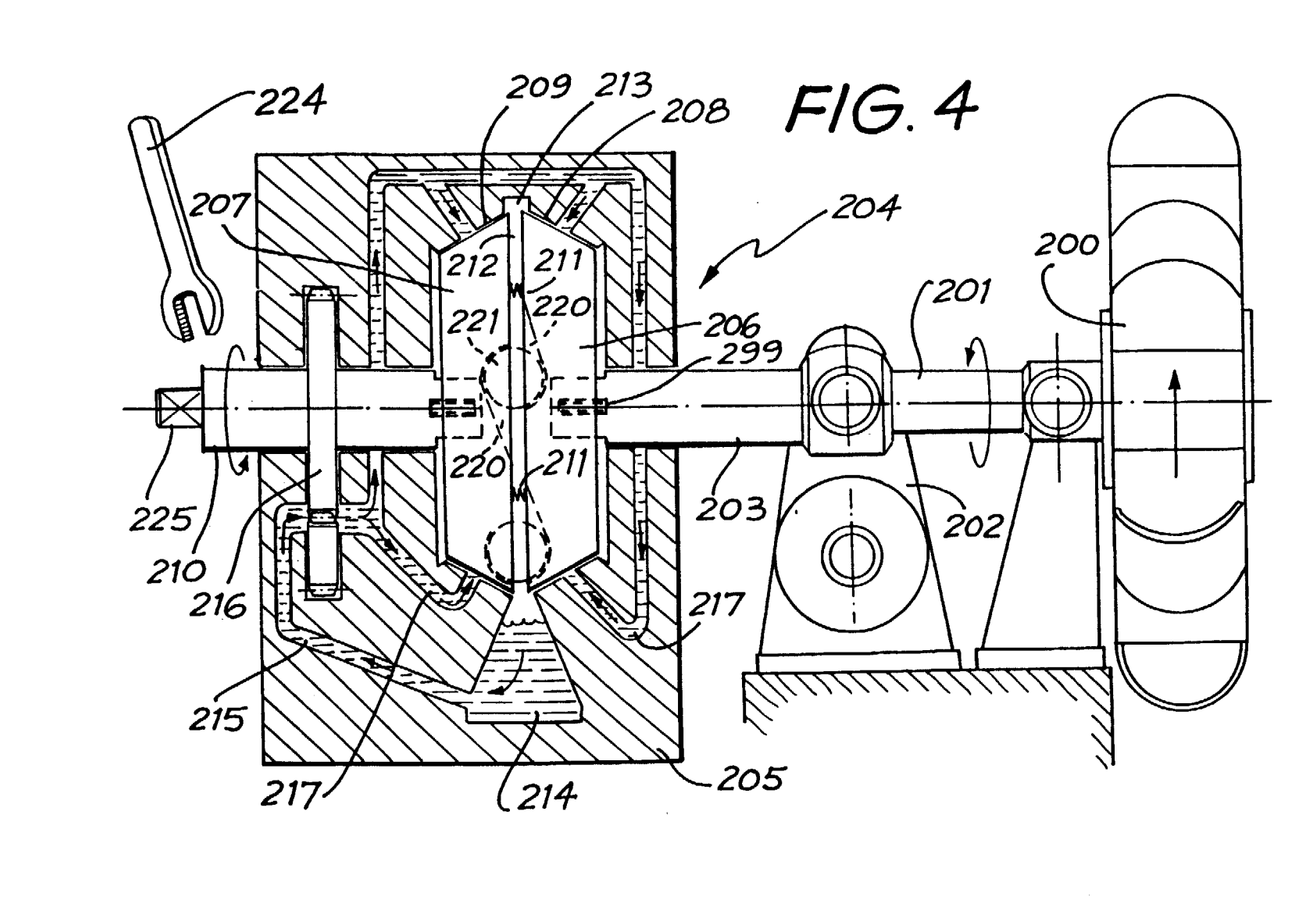
FIG. 4 shows a braking mechanism in vertical section and incorporating an oil pump.

FIG. 4 shows a bucket conveyor 200 driven by a drive shaft 201 of a motor 202. The drive shaft 201 is extended at 203 to a braking mechanism 204 designed to prevent torque reversal of the drive shaft 201.

The mechanism 204 comprises a casing 205 containing two rotary disc members 206, 207 having frusto-conical rims 208, 209 respectively equipped with braking surfaces (not shown) of any known type. The disc member 206 is slideably splined at 299 to the shaft 203 as depicted by the key 299, and the disc member 207 is slideably splined in similar manner to a second shaft 210 arranged coaxially with respect to the shaft 203. The two shafts 203 and 210 are journalled into the casing so that they are free to turn.

The two disc members 206, 207 are gently forced apart by compression springs 211 so that the frusto-conical braking surfaces engage complementary frusto-conical braking surfaces of the casing provided inside a cavity 212 in which the disc members rotate. The casing braking surfaces are made of a harder material than those of the disc members 206, 207.

The opposed faces of the disc members 206, 207 provide between them a centrifugal pumping cavity from which oil is forced outwardly into an annular channel 213 leading into a sump 214 in the casing 205. Oil is withdrawn from the sump 214 by way of a passage 215 leading to a gear pump 216 inside the casing and driven by the shaft 210. The gear pump 216 supplies oil under pressure through ducts 217 to provide hydraulic lubricating cushions of oil between the opposed braking surfaces of the disc members and the casing. These hydraulic cushions lessen the extent of frictional braking occurring between the braking surfaces, as compared with the frictional braking which would otherwise occur by virtue of the compression of the springs 211.

Figure 5:
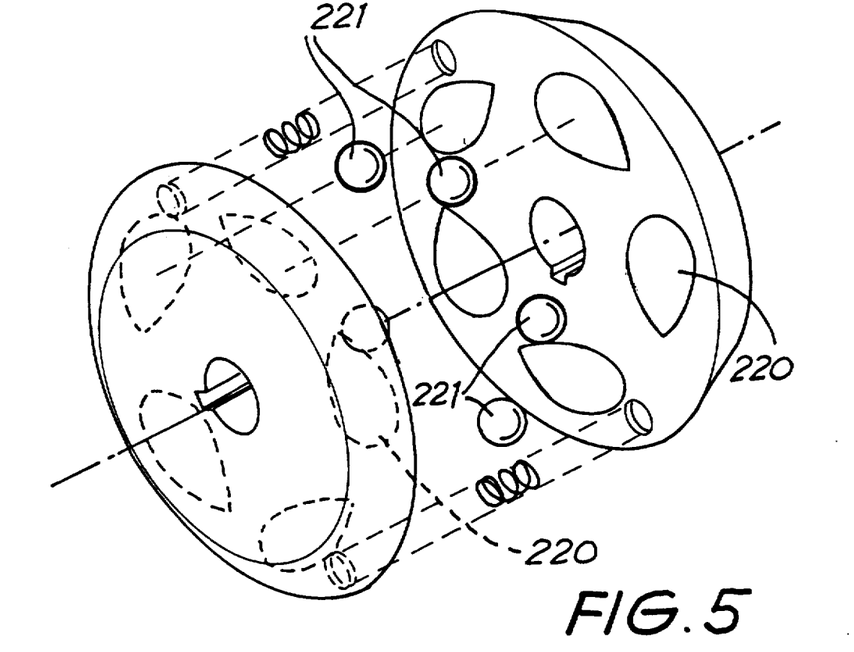
FIG. 5 is a perspective exploded view showing an arrangement of camming means and thrust-resistant means disposed between opposed faces of two members, used in the braking mechanism of FIG. 4.

The opposed faces of the disc members 206, 207 are each formed with a ring of eight equi-arcuately spaced, tear-drop shaped recesses 220 as shown in FIG. 5. The two rings of recesses 220 are arranged at the same radius and opposite one another, and they are identical. However the tear-drop recesses of one ring point in the opposite direction around the ring to the tear-drop recesses of the other ring. Each pair of opposed recesses accommodates a hard steel ball 221. The balls 221 are each acted upon by the camming effect of their associated recesses so that they control the spacing between the disc members 206, 207.

One end of the shaft 210 projects out of the casing 205 and its terminal portion 225 is of square cross-section to receive a spanner 224.

OPERATION OF THIRD EMBODIMENT

The mechanism of FIGS. 4 and 5 operates as follows:

During normal operation of the bucket elevator 200, the motor 202 is delivering torque to it and also driving the shaft 203. This causes the disc member 206 to turn in a direction causing the balls 221 to occupy the positions in the recesses 220 denoted in broken outline in FIG. 4. Drive is transmitted via the balls 221 to the disc member 207. This causes rotation of the shaft 210 and the gear pump 216, to circulate oil through the ducts 217. An oil cushion is thus created between the opposed frusto-conical braking surfaces of the disc members 206, 207 and the casing 205, so that, despite the compression of the springs 211, the energy loss through braking is small as the oil cushion ensures minimal frictional contact between the braking surfaces.

If now the motor 202 fails, the shaft 201 is turned by the bucket elevator 200 in the reverse direction. The ramp surfaces of the tear-drop recesses 220 of the disc member 206 engage the balls 221 causing them to force the opposed faces of the disc members 206, 207 apart. The loss of drive to the disc member 207 caused by the movement of disc member 206, causes the output pressure of the gear pump 216 to reduce. The oil cushion between the braking surfaces collapses to allow the springs 211 to increase the reaction at the braking surfaces. Both members 206 and 207 are thus rapidly braked to a halt. Reverse running of the bucket elevator is prevented.

The mechanism 204 remains effective to hold the bucket elevator 200 in a braked state until the motor 202 starts once again. If it is required to lower the bucket elevator progressively, under complete manual control, the handle 224 is applied to the terminal portion 225 of the shaft 210 and turned in a direction to bring the deepest parts of the recesses 220 opposite one another. This reduces the spacing between the disc members 206, 207 slightly to allow the disc member 206 to follow the manual turning movement of the disc member 207. This allows the shaft 203 to turn gradually and thus the load can be lowered under the complete control of the handle 224.

MODIFICATION OF THIRD EMBODIMENT

Figure 7:
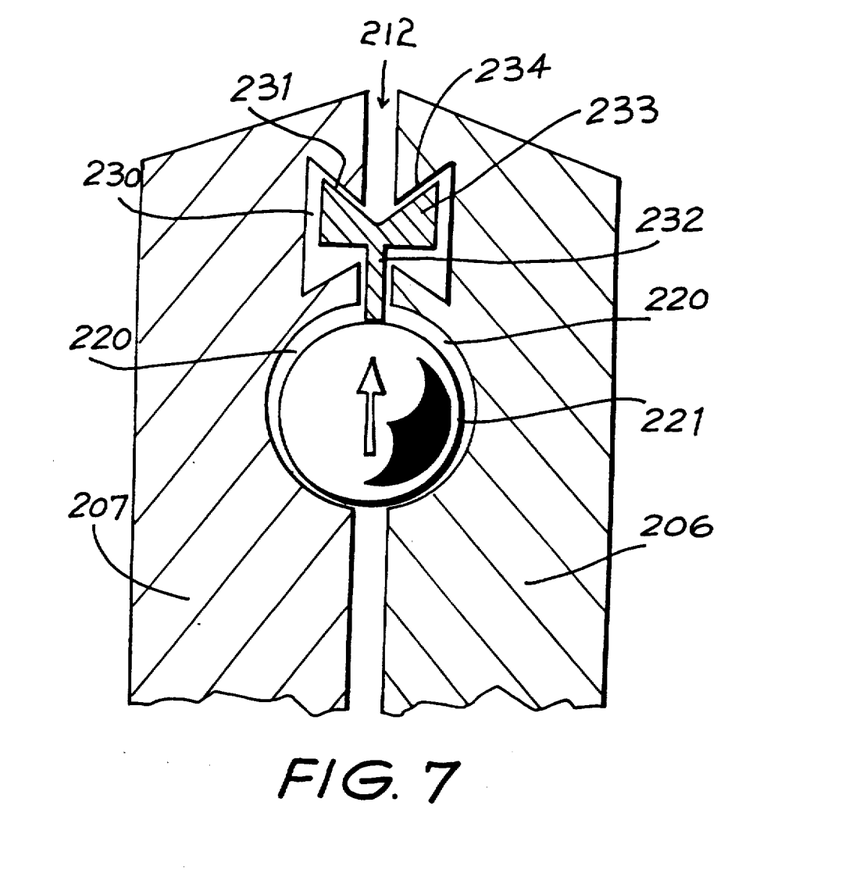
FIG. 7 shows, in enlarged section, a modification to the braking mechanism of FIG. 4 which is positioned radially outwards of respective balls to provide a speed-sensitive control for the braking mechanism.

FIG. 7 shows a modification to the arrangement of FIG. 4 which is advantageous when the brake is to be used in conjunction with a high speed shaft 203.

The members 206, 207 are provided radially outwards of the balls 221, with respective chambers 230 opening into the cavity 212 lying between the members 206, 207. The chambers have ramp surfaces 234, respectively.

A camming unit 233 of generally T-shape is arranged partially in the chambers 230 and partially in the cavity 212 so that the stem 232 of the "T" extends radially inwards between the members 206, 207 and has its terminal portion extending into the space between the two tear-shaped recesses 220. The head of the "T" of the unit 223 extends into the chambers 230 and is provided with two convergent ramp surfaces 231 which are complementary to the ramp surfaces 234 of the chambers 230.

OPERATION OF MODIFIED THIRD EMBODIMENT

In operation of the embodiment of FIG. 7, the balls 221 are forced outwardly by centrifugal forces with rotation of the members 206 and 207. At high speeds of rotation, the outward force of the balls 221 is substantial, and acts on the terminal portion of the stem 232 of the unit 233 to force its ramp surfaces 231 against the ramp surfaces 234 of the members 206, 207. This force, dependent on the angle of the ramp surfaces, amongst other factors, acts to force the two members 206, 207 towards one another as the speed of rotation increases. In this way the generation of heat losses in the vicinity of the braking surfaces of the casing can be substantially reduced at high speeds of rotation, at times when the brake is not required to become effective.

When braking is required, its operation is achieved as has already been described with reference to FIG. 4.

The arrangement of braking mechanism as shown in FIG. 4 has enabled the mechanism to be used with drive speed in the region of 1000 rpm, and by using the modification of FIG. 7 it is believed that rotational speeds as high as 1400 rpm can be handled without incurring excessive frictional heat losses.

DESCRIPTION OF THE FOURTH EMBODIMENT

Figure 6:
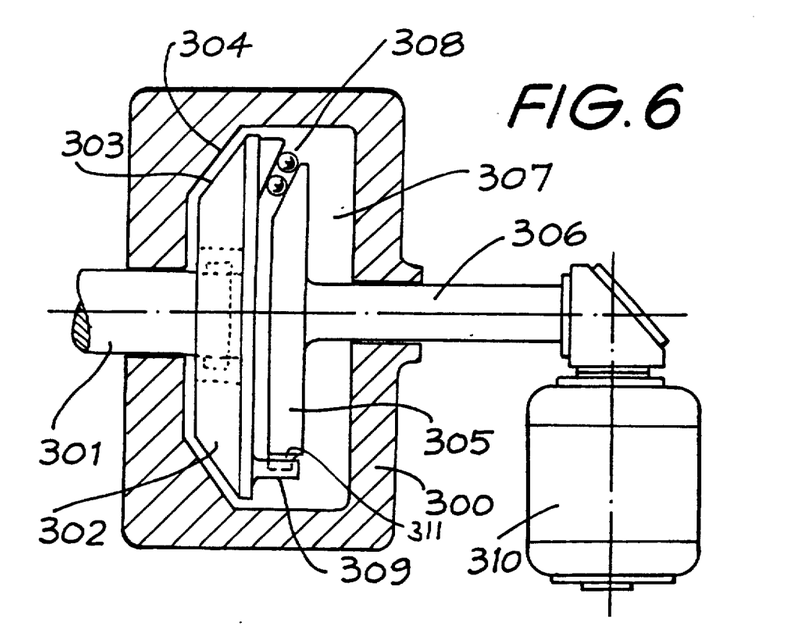
FIG. 6 is a diagrammatic vertical section through a braking mechanism having one pair of opposed braking surfaces.

FIG. 6 shows, diagrammatically, an arrangement of braking mechanism using only one pair of complementary braking surfaces. In this figure, a casing 300 contains an output drive shaft 301 slackly splined to a disc member 302. A frusto-conical braking surface 303 is provided on the rim of the member 302 and is complementary to a similarly shaped braking surface 304 provided inside the casing 300.

The disc member 302 is arranged opposite a rotary plate 305 attached to one end of a drive shaft 306 and located inside a cavity 307 in the casing 300. A motor 310 drives the shaft 306.

The plate 305 carries an abutment 311 which, with rotation of the plate 305 in one direction only, engages a stop 309 on the disc member 302 in a similar way to the arrangement referenced 140, 141 in FIG. 3. A camming arrangement of balls and recesses, similar to that which is referenced 142, 143, 150 in FIG. 3, is also provided between the plate 305 and the disc member 302. The camming arrangement behaves similarly to vary the separation of the disc member 302 from the plate 305 in accordance with the direction of the applied torque. A spring (not shown) maintains a slight rubbing contact between the braking surfaces during normal operation of the mechanism.

OPERATION OF THE FOURTH EMBODIMENT

Under normal operating of the mechanism of FIG. 6, the disc member 302 is at its closest position to the plate 305 and the abutment on the plate engages the stop 309 so that the drive of the shaft 306 is transmitted through the disc member 302 to the output shaft 301.

If the direction of the torque transmission through the mechanism reverses, the stop 309 moves away from the abutment of the plate 305 and the camming arrangement 308 becomes effective, as has been described with reference to FIG. 3, to force the disc member 302 away from the plate 305. This brings the braking surfaces 303, 304 into forceable braking engagement with one another so that rotation of the shaft 301 is braked until the direction of applied torque is restored.

We claim:

1. A braking mechanism which becomes automatically effective when there is a reversal in the direction of applied torque, comprising:

two members having a common axis and between which relative rotation about the axis occurs when there is reversal in the direction of the applied torque;

a housing surrounding the two members;

a first braking surface provided on one of the members and a second complementary and opposed braking surface provided on the housing;

first means accommodating change in the spacing between the two members to control the extent of the braking;

second means responsive to a reversal in torque direction to permit change in the relative angular positions of the members;

camming means incorporating thrust-resistant means and responsive to the change in the relative angular positions of the members, to alter the spacing between the members;

resilient means for biasing the braking surfaces towards one another to induce the required braking action promptly when the direction of torque is reversed;

a hydraulic pump operated by drive from one of the members and having an output side; and hydraulic ducts leading from the output side of the pump to the vicinity of the complementary braking surfaces to create a hydraulic cushion between them when the direction of torque through the mechanism is not reversed, the drive to the hydraulic pump diminishing, during braking, to collapse the cushion and permit prompt braking of the mechanism.

2. A mechanism as claimed in claim 1, in which both members rotate and each is provided with its own braking surface for engaging a respective braking surface provided inside the surrounding housing.

3. A mechanism as claimed in claim 1, in which the camming means include pairs of recesses, the recesses of each pair being formed, respectively, on opposed faces of the members and being of tear-drop shape; a thrust-resistant ball being accommodated between the recesses of each pair for transmitting drive between the two members when the torque is not reversed, and for forcing the two members apart when the torque is reversed, to induce braking.

4. A mechanism as claimed in claim 1, in which the complementary braking surfaces of the housing and of the members are of different hardness, respectively.

5. A mechanism as claimed in claim 1, including centrifugally operated means which bias the braking surfaces apart at relatively high rotational speeds, and reduce the bias as the speed diminishes.

6. A mechanism as claimed in claim 1, including a handle allowing one of the members to be manually rotated with respect to the other in the direction of the load, so that the other member can follow the manual rotation and allow the load to be moved, under complete control, in the direction of the reversed torque.

7. A mechanism as claimed in claim 1, comprising a motor coupled drivingly to a first of said two members for applying torque in a driving direction to move a load and means for applying torque to the second member in the opposite direction, so that the first member can follow the rotation of the second member in response to the torque applied thereto in said opposite direction and allow the load to be moved, under complete control, in the direction of the reversed torque.

8. A mechanism as claimed in claim 7, wherein the means for applying torque to the second member comprises a handle for manual application of torque.

9. A mechanism as claimed in claim 7, wherein the motor is coupled to the first member by a shaft, and the shaft is coupled directly to the load.

10. A braking mechanism which becomes automatically effective when there is a reversal in the direction of applied torque, including: two members turned by the applied torque about a common axis and providing at least one braking surface engageable with a complementary braking surface of a surrounding housing; the two members being angularly displaceable and relatively axially moveable with respect to one another and having camming means arcuate about their common axis and engaged by thrust-resistant means which allow relative rotation of the members to bring different parts of the camming means into engagement with the thrust-resistant means and so vary the spacing between the members; the profile of the camming means being so chosen that relative rotation of one of the members in one direction of rotation with respect to the other, and produced by a reversal in the applied torque, causes the spacing between the members to change and bring said one braking surface into braking engagement with the complementary braking surface of the housing, and the mechanism also including a hydraulic pump operated by drive from one of the members and hydraulic ducts leading from the output side of the pump to the vicinity of the complementary braking surfaces to create a hydraulic cushion between them when the direction of torque through the mechanism is not reversed, the drive to the hydraulic pump diminishing, during braking, to collapse the cushion and permit prompt braking of the mechanism.

11. A mechanism as claimed in claim 10, in which the members comprise disc members splined to respective shafts so as to be axially slideable thereon, each disc member having a frusto-conical braking rim which, when the two members are urged apart, engages with a complementary braking surface provided on the inside of the housing.

12. A mechanism as claimed in claim 10, in which one of the members is axially moveable and carries a braking surface, while the other member is not axially moveable and is attached to an input drive shaft of the mechanism, said one member being axially slideable on an output drive shaft from the mechanism, and the two members having between them a pair of abutments which engage, during non-reversal of the applied torque, to transmit drive between the members; and the camming means comprises an arrangement of balls and ramp surfaces located between the members for forcing the two members apart when the direction of the applied torque is reversed.

13. A mechanism as claimed in claim 10, comprising a motor coupled drivingly to a first of said two members for applying torque in a driving direction to move a load and means for applying torque to the second member in the opposite direction, so that the first member can follow the rotation of the second member in response to the torque applied thereto in said opposite direction and allow the load to be moved, under complete control, in the direction of the reversed torque.

14. A mechanism as claimed in claim 13, wherein the means for applying torque to the second member comprises a handle for manual application of torque.

15. A mechanism as claimed in claim 13, wherein the motor is coupled to the first member by a shaft, and the shaft is coupled directly to the load.

16. A braking mechanism which becomes automatically effective when there is a reversal in the direction of applied torque, comprising:
a housing;
first and second members in the housing and having a common axis of rotation and both being turned by the applied torque in a driving direction to rotate about said common axis, said first member being connected to be driven in unison with said applied torque in the driving direction and said second member being angularly displaceable and relatively axially moveable with respect to said first member and rotating in synchronism with it as long as the applied torque is in the driving direction;
first and second braking surfaces on said first and second members respectively, said first and second braking surfaces being engageable with respective opposed braking surfaces of said housing;
camming means arranged arcuately about the common axis of rotation of the first and second members and engaged by thrust-resistant means which is responsive to a reversal in the direction of the applied torque to bring different parts of the camming means into engagement with the thrust-resistant means to move the two members axially relative to one another to bring said first and second braking surfaces into braking engagement with their respective opposed braking surfaces of the housing to bring both members rapidly to rest; and
means for manually applying torque to said second member to rotate the second member in the direction of the load with respect to said first member when both members have been braked to a halt, to allow the load to be progressively moved under complete control and in the direction of the reversed torque.

17. A mechanism as claimed in claim 16, in which the driving torque is applied directly to the load and to the first member.

18. A mechanism as claimed in claim 16, including centrifugally-operated means which bias the braking surfaces apart at relatively high rotational speeds, and reduce the bias as the speed diminishes.

19. A mechanism as claimed in claim 16, in which said housing includes hydraulic pumping means responsive to the rotational speeds of the members in the driving direction of the applied torque, to create a hydraulic cushion between the braking surfaces of the members and the surrounding housing to hold them apart during rotation of the members in the driving direction, the cushion collapsing when the rotational speed of the members diminishes during braking so that the members are braked more rapidly to a halt.

* * * * *